United States Patent
Yuan et al.

(10) Patent No.: US 10,915,353 B2
(45) Date of Patent: Feb. 9, 2021

(54) INTELLIGENT PROCESSOR FOR USER-PROVIDED ROUTINES IN A TRANSACTION PROCESSING SYSTEM

(71) Applicant: INTERNATIONAL BUSINESS MACHINES CORPORATION, Armonk, NY (US)

(72) Inventors: Jack Chiu-Chiu Yuan, San Jose, CA (US); Jeffrey L. Maddix, Morgan Hill, CA (US); Nai-Wen Shih, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/371,167

(22) Filed: Apr. 1, 2019

(65) Prior Publication Data
US 2020/0310861 A1  Oct. 1, 2020

(51) Int. Cl.
*G06F 9/46*  (2006.01)
(52) U.S. Cl.
CPC .................................... *G06F 9/466* (2013.01)
(58) Field of Classification Search
CPC ........................................................ G06F 9/466
See application file for complete search history.

(56) References Cited

U.S. PATENT DOCUMENTS

| 5,068,874 A | 11/1991 | Leitch | |
|---|---|---|---|
| 5,608,874 A | 3/1997 | Ogawa et al. | |
| 6,885,641 B1 | 4/2005 | Chan et al. | |
| 9,286,105 B1* | 3/2016 | Levchenko | G06F 9/45558 |
| 2007/0134068 A1* | 6/2007 | Smith | G06F 9/4401 406/39 |
| 2012/0131115 A1* | 5/2012 | Levell | G06F 9/466 709/206 |
| 2013/0246513 A1* | 9/2013 | Zaveri | G06F 3/0626 709/203 |
| 2015/0067819 A1* | 3/2015 | Shribman | H04L 67/06 726/12 |
| 2016/0028673 A1* | 1/2016 | Jeyaraman | H04L 51/32 709/206 |
| 2016/0337426 A1* | 11/2016 | Shribman | H04L 65/608 |

OTHER PUBLICATIONS

Disclosed Anonymously, "Methodology for Intelligent Recovery Model for System With Missing/Corrupted Transactional Log Files", ip.com Prior Art Database, Dec. 5, 2014, ip.com No. IPCOM000239860D, 6 pages.

(Continued)

*Primary Examiner* — Adam Lee
(74) *Attorney, Agent, or Firm* — Teddi E. Maranzano

(57) ABSTRACT

Methods, systems and computer program products for an intelligent processor for user-provided routines (IPUR) in a transaction processing system are provided. An interface module, interposed between a transaction processing module and a user-provided routine intercepts a request for an operation. If the user-provided routine is supported for the request, the interface module asynchronously passes the request to the user-provided routine and synchronously passes the request to the IPUR. Thus, the IPUR learns the processing of the user-provided routine, which eventually can be removed from the transaction processing system.

18 Claims, 9 Drawing Sheets

(56) References Cited

OTHER PUBLICATIONS

Disclosed Anonymously, "Smart System for Optimal Logging With Intelligent Row Format", ip.com Prior Art Database, Mar. 5, 2013, ip.com No. IPCOM000225772D, 7 pages.
Gibbons, "Beyond REF-ARF: Toward an Intelligent Processor for a Nondeterministic Programming Language", Department of Mathematics Naval Postgraduate School, Aug. 1972, Monterey, CA, 257 pages.
IBM, "Intelligent Re-Routing of Transaction Based Upon Logical Relationships Among Data Base Processing Engines", ip.com Prior Art Database, Dec. 28, 2009, ip.com No. IPCOM000191283D, 6 pages.

\* cited by examiner

INTELLIGENT PROCESSOR FOR USER-PROVIDED ROUTINES IN A TRANSACTION PROCESSING SYSTEM

BACKGROUND

The present invention generally relates to user-provided routines, and more specifically, to user-provided routines in a transaction processing system.

Users of a transaction processing system (TPS) can incorporate software routines to customize the various functions of the TPS according to specific needs of the enterprise. These user-provided routines intercept a transaction at various points in the lifecycle of the transaction, and alter attributes of the transaction to control its flow through the system. However, user-provided routines tend to be difficult to maintain for software developers because skills change over time.

SUMMARY

Embodiments of the present invention are directed to a computer-implemented method, a computer system, and a computer program product for an intelligent processor for user-provided routines (IPUR). An interface module, interposed between a transaction processing module and a user-provided routine intercepts a request for an operation. If the user-provided routine is supported for the request, the interface module asynchronously passes the request to the user-provided routine and synchronously passes the request to the IPUR. Thus, the IPUR learns the processing of the user-provided routine, which eventually can be removed from the transaction processing system.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
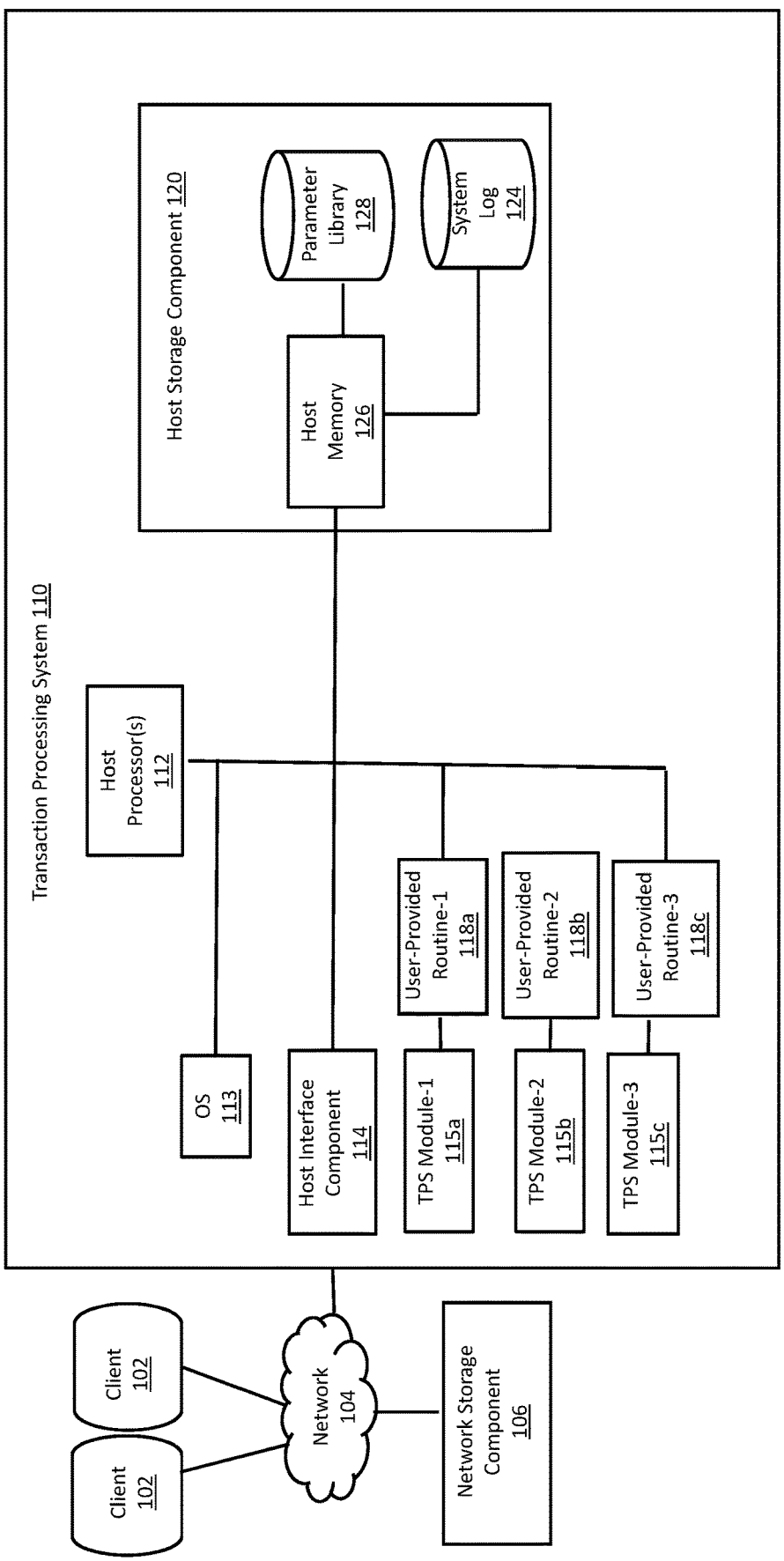
FIG. 1 depicts a block diagram of a computer system for use in implementing one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Turning to the figures, FIG. 1 depicts an example block diagram of a transaction processing system (TPS) 110 which is in communication with one or more components. For ease of exposition, only one TPS 110 is shown in FIG. 1. However, multiple TPS 110 may be distributed over a wide geographic area and be in electronic communication with each other, and with the other components shown in FIG. 1, via the network 104. For example, one or more TPS 110 can communicate with one or more clients 102, two of which are shown, via a network 104. Additionally, each client 102 can issue commands to direct the operation of the TPS 110, and to direct the operation of the IPUR 250.

As shown in FIG. 1, the TPS 110 is configured for responsiveness in application environments where a high volume of online transactions occurs, such as in a reservation system, or processing inquiry and response messages from a large population of user clients 102 that are connected to the TPS 110 over the network 104.

The TPS 110 attempts to provide predictable response times. To accomplish this, the TPS 110 executes only predefined, structured transactions of short duration. The TPS transaction can be divided into discrete pieces of work, each of which can be executed in parallel. Each discrete piece of work can be referred to as a TPS module, such as TPS modules 115a, b, and c. Hereinafter, TPS module 115 includes references to TPS modules 115a, 115b, and 115c collectively unless specific reference is made to a particular TPS module. Similarly, user-provided routine 118 includes references to user-provided-modules 118a, 118b, and 118c collectively unless specific reference is made to a particular user-provided module. The addition of a user-provided routine 118 customizes the functionality of the TPS module 115. The user-provided routine 118 intercepts the processing of the transaction and can alter attributes of the transaction to control the execution flow for that transaction. As part of the configuration of the TPS 110, the TPS module 115 is associated with a particular user-provided module 118, which responds to calls from its associated TPS module 115.

Although a user-provided routine 118 can enhance transaction efficiency, the user-provided routine 118 can introduce maintenance difficulties to the TPS 110. Such maintenance difficulties can result, for example, from lack of adequate documentation, lack of institutional knowledge regarding the purpose of the routine, and software engineers no longer having knowledge of the source code software language. As a result, maintaining the user-provided routine 118 requires increased expense to the enterprise, such as developing, or contracting for, specialized skills.

The TPS 110 can include one or more components, such as a host processor 112, operating system (OS) 113, a host interface component 114, one or more TPS modules 115, one or more user-provided routines 118, and a host storage component 120. The host storage component 120 can include other components, such as host memory 126, a system parameter library 128, and a system log 124.

The host processor 112, the host interface component 114, and the host storage component 120 may be combined into a fewer number of components or may be separated into further components. Also, the host processor 112, the host interface component 114, and the host storage component 120 may be implemented in software or hardware, or a combination of software and hardware.

The host processor 112 is configured to control the operation of the TPS 110. For example, the host processor 112 can initiate and manage the operations of each of the other components at the TPS 110. The host processor 112 may also determine, based on received and/or stored data, user preferences and/or predefined settings, how the TPS 110 operates.

The host processor 112 can be any suitable processor(s), controller(s) and/or digital signal processor(s) that can provide sufficient processing power depending on the configuration, purposes and requirements of the TPS 110. In some embodiments, the host processor 112 can include more than one processor with each processor being configured to perform different dedicated tasks.

The host interface component 114 can be any interface that enables the TPS 110 to communicate with other devices and systems. In some embodiments, the host interface component 114 can include at least one of a serial port, a parallel port or a USB port.

The host storage component 120 can store data and/or resources, including system parameters, user preferences, and other application parameters, in a system parameter library 128. The host storage component 120 also includes one or more system logs 124 where the TPS 110 stores the results of system activity, such as system events, trace data, and transaction execution results.

The host memory 126 can store data and/or resources for providing runtime environments to the TPS module 115, and user-provided routine 118. The host memory 126 can include RAM, ROM, or some other data storage elements, such as disk drives. The host memory 126 can store the host OS 113 that is operated by the host processor 112.

Referring still to FIG. 1, the network storage component 106 can store certain data and/or resources associated with providing runtime environments to the TPS module 115 by the TPS 110. For example, the network storage component 106 can store the resources that are less frequently required and/or data that is not as frequently accessed by the TPS 110 and/or the client 102 in order to more effectively allocate the storage capacity of the host storage component 120. In some embodiments, the network storage component 106 may operate as a back-up storage component for the TPS 110, and receive, at predefined time intervals, data already stored at the host storage component 120. In embodiments where multiple TPS 110 are provided, the network storage component 106 can store data and resources that are common to the various TPS 110.

The client 102 may be any networked computing device operable to connect to the network 104 through either a wired or wireless connection. The client 102 can include such devices as an electronic tablet, a personal computer, workstation, server, and mobile device.

The network 104 can be any network capable of carrying data, including an IP-based network for communication between the TPS 110 and any external server or client. The network 104 can be a managed IP network administered by a service provider and implemented in a wireless fashion, e.g., using wireless protocols and technologies, such as Wi-Fi, WiMAX. The network 104 can also be a packet-switched network such as a local area network, wide area network, metropolitan area network, Internet network, or other similar type of network environment. The network 104 may be a fixed wireless network, a wireless local area network (LAN), a wireless wide area network (WAN) a personal area network (PAN), a virtual private network (VPN), intranet or other suitable network system and includes equipment for receiving and transmitting signals.

Figure 2:
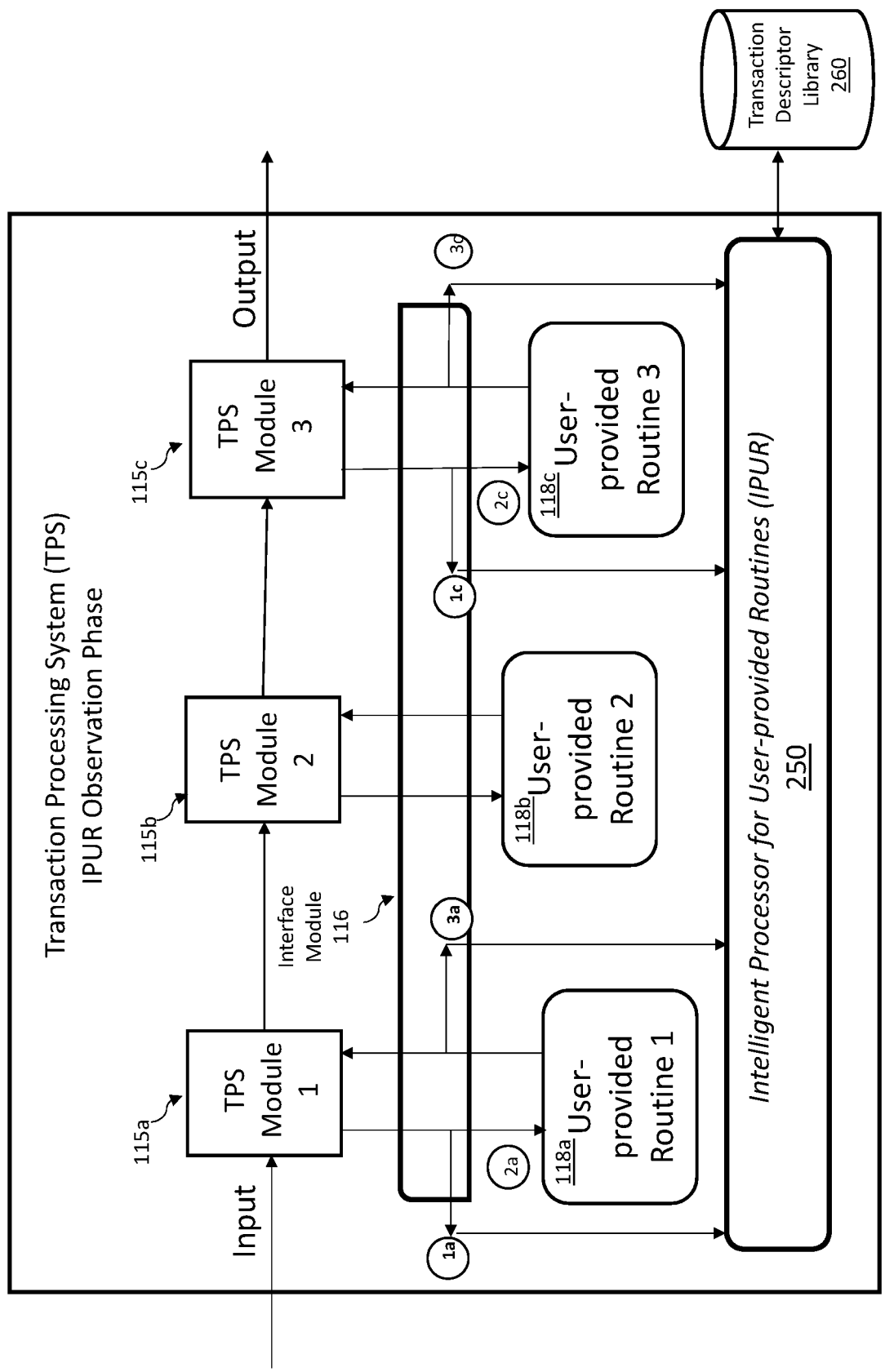
FIG. 2 depicts a block diagram for the observation phase of the intelligent processor for user-provided routines (IPUR) according to one or more embodiments of the present invention.

Referring now to FIG. 2, the observation phase of the intelligent processor for the user-provided routines (IPUR) system is shown. FIG. 2 improves the TPS 110 shown in FIG. 1 through the addition of an IPUR 250 and the interface module 116.

The interface module 116 is interposed between the TPS module 115 and the user-provided routine 118. The IPUR 250, in combination with the interface module, learns the behavior of the user-provided routines because the interface module intercepts the transmission of parameters and commands from the TPS module 115 during the execution of the transaction. In an embodiment, the TPS module 115 is enhanced to call the interface module 116 (FIG. 2) instead of directly calling its associated user-provided routine 118 (as in FIG. 1). The enhanced TPS module 115 may include, for example, a macro interface that associates it with a particular user-provided routine 118. The macro interface can include various commands, flags, or options by which the TPS module 115 specifies the name of the user-provided routine 118 to call, along with input parameters that are defined by the operation of the user-provided routine 118. In this way, the interface module 116 acts like an agent. In summary, the original caller, the TPS module 115, is enhanced to invoke a macro, which then calls the interface module 116. The interface module 116 calls the user-provided routine 118.

Similarly, the interface module 116 intercepts the transaction results and condition codes before returning them to the TPS module 115. The interface module 116 communicates with the IPUR 250 to build the behavior profile, i.e., transaction descriptor, for each interaction of the TPS module 115 and user-provided routine 118. There may be more than one transaction descriptor per TPS module 115, depending on the actions the TPS module 115 can take. After a user-defined observation period, when the TPS module 115 executes, the interface module 116 circumvents the user-provided routine 118, and communicates with the IPUR 250 to execute the transaction using the profile. Eventually, the user-provided routines 118 can be removed from the TPS 110, thus eliminating the maintenance issues outlined above. Future transaction processing behavior by the TPS module can be modified, viewed, and deleted by a command interface, which can be accessed, for example, by a client 102 that accesses the TPS 110 through the network 104.

In FIG. 2, the interface module 116 observes the interaction between the TPS module 115a and 115c and user-provided routine 118a and 118c. The observation phase can be initiated by a command that identifies which user-provided routines should be observed. As shown, observation is identified for user-provided routines 118a and 118c, but not for user-provided routine 118b.

The ability to bypass observing a particular user-provided routine allows the detailed operation of potentially sensitive routines, such as those involving security, to be kept private and subject to enterprise access controls.

The length of time for the observation phase for any TPS module and user-provided routine pair is user-defined. For example, a TPS module and user-provided routine pair that executes a complex series of transaction codes depending on the input parameters may be observed for a longer period than a pair that only executes one transaction code.

Once a user-provided routine 118a, and c is identified for observation, the interface module 116 receives control prior to the user-provided routine 118a and c. Here, the interface module 116 passes asynchronous control to the IPUR 250, along with a parameter list describing the operation that user-provided routine 118a and 118c will perform. The interface module 116 learns the parameter list and the operation when the interface module 116 intercepts the TPS module 115a and 115c. This asynchronous call is shown as 1a and 1c, where the interface module 116 bypasses the user-provided routine 118a and 118c.

The interface module 116 also synchronously passes control to the user-provided routine 118a and 118c to execute its portion of the transaction. The synchronous call, shown as 2a and 2c, is taken to avoid an impact to the performance of the transaction.

The IPUR 250 creates a transaction descriptor detailing the operation of the user-provided routine 118a and 118c, and stores it in the transaction descriptor library 260 by transaction name or some other unique identifier. The execution of the user-provided routine 118a and 118c can be repeated as needed during the observation phase. The results of the execution can be output for verification, such as to a transaction log or similar error report. Subsequently, the output from the user-provided routine 118a and 118c can be compared to that of the transaction descriptor. The transaction descriptor can be modified, as needed, to ensure the accurate execution of future iterations of the transaction descriptor.

An example of a transaction descriptor is shown in TABLE 1, although other formats are possible, depending upon the implementation of the IPUR 250. A TPS 110 can have many transaction descriptor entries created. Each transaction descriptor entry is a sequence of characters, and has a defined format. The example format of a transaction descriptor can be as follows:

TABLE 1

Character 1-3: to identify the name of user provided routine.
Character 5-11: to identify the transaction name or the message ID of a transaction. The entry can be used to uniquely identify the transaction descriptor entry for a user provided routine.
Charter 13-29: to identify an action code
Charter 31-44: optional parameter 1, if needed
Charter 46-59: optional parameter 2, if needed
Charter 61-74: optional parameter 3, if needed
More parameters can be added if needed by the TPS 110 implementation.

The following is an example transaction descriptor as implemented in a TPS 110:
AAA,TRAN1,ACTION=SWITCH, TRANCODE=TRAN This descriptor entry "AAA" is for the name of the user-provided routine DFS00AAA. "TRAN1" is the input transaction name in the TPS 110. The action code "SWITCH" is to tell the TPS 110 to switch the input transaction name from TRAN1 to TRAN2 for the rest of transaction processing.

The following is another example transaction descriptor as implemented in a TPS 110:
BBB,JEFF001,ACTION=PRINTER, HOSTNAME=TCPIP,PORT=9999

This descriptor entry "BBB" is for the user-provided routine DFS00BBB. "JEFF001" is a message identification number which uniquely identifies this entry for "BBB". Action code "PRINTER" is to tell the TPS 110 to route the transaction output to a printer. The "HOSTNAME" and "PORT" are used to define the destination of the printer.

The user-provided routine 118a and 118c returns to the interface module 116 upon completion of its portion of the transaction. The interface module 116 synchronously returns to the TPS module 115a and 115c.

Upon completion, the interface module 116 intercepts the return of the user-provided routine 118a and 118c to the TPS module 115a and 115c. The interface module 116 synchronously calls the IPUR 250 with the intercepted parameter list that includes the return code, transaction code and related actions taken by the user-provided routine 118a and 118c. This is shown as 3a and 3c. The interface module 116 learns the parameter list describing the results of the operation of the user-provided routine 118a and 118c by intercepting the return call from the user-provided routine 118a and 118c to the TPS module 115a and 115c. The IPUR 250 stores the results parameter list into the associated transaction descriptor in the transaction description library 260. The IPUR 250 can store multiple variations of the parameter list and return parameter list in cases where a user-provided routine can perform more than one operation, based on the parameters sent by a TPS module.

The transaction descriptors in the transaction descriptor library 260 can be modified, updated, and deleted by a command interface, which can be accessed, for example, by a client 102 that accesses the TPS 110 through the network 104.

Figure 3:
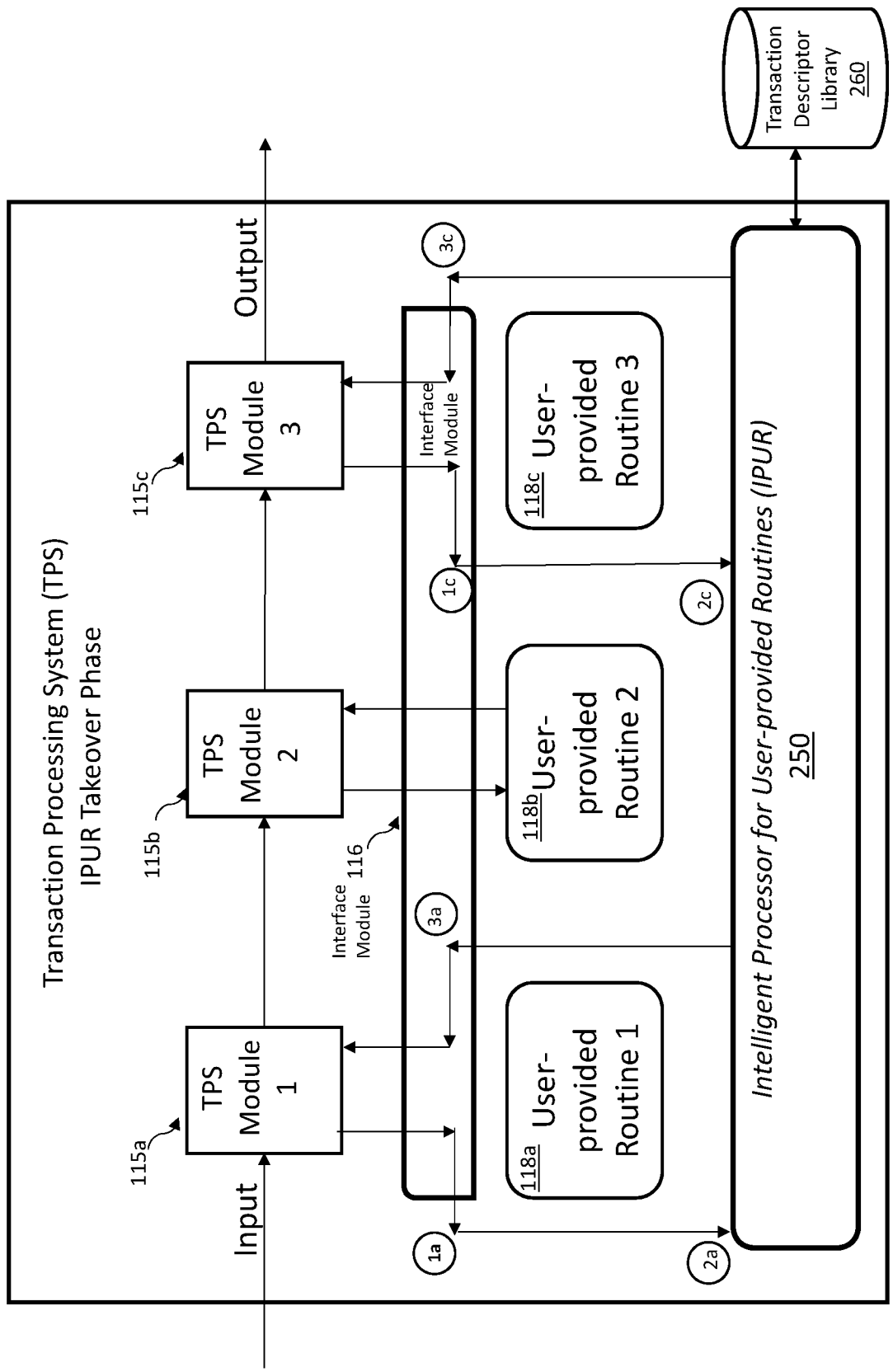
FIG. 3 depicts a block diagram for the takeover phase of the IPUR according to one or more embodiments of the present invention.

FIG. 3 depicts the takeover phase of the IPUR 250. In the takeover phase, the interface module 116 bypasses the call to the user-provided routine 118a and 118c. The transaction descriptor created during the observation phase is executed instead. The takeover phase, which follows the observation phase, can be initiated by a command that identifies which user-provided routines the IPUR 250 should take over. As shown, takeover is identified for user-provided routines 118a and 118c, but not for user-provided routine 118b. This is shown as 1a and 1c. The ability to selectively takeover particular user-provided routines allows the detailed operation of potentially sensitive user-provided routines, such as those involving security, to be kept private and subject to enterprise access controls.

As shown as 2a and 2c, the interface module 116 synchronously calls the IPUR 250 to execute the transaction descriptor that now replaces the user-provided routine 118a and 118c. The IPUR 250 selects the transaction descriptor from the transaction descriptor library 260 based on a unique identifier.

Upon completion, and as shown as 3a and 3c, the IPUR 250 returns control to the interface module 116, which returns the results of the IPUR 250 execution to the TPS module 115a and 115c.

The user-provided routines 118a and 118c can be removed from the TPS 110, since they will no longer be invoked by the TPS module 115a and 115c. Consequently, no future maintenance will be required for the user-provided routines 118a and 118c. Additionally, the replacement of the user-provided routines 118a and 118c with a respective transaction descriptor is transparent to the TPS modules 115a and 115c. The user-provided routine 118b, however, must remain in the TPS 110 because no transaction descriptor was created for it.

Figure 4:
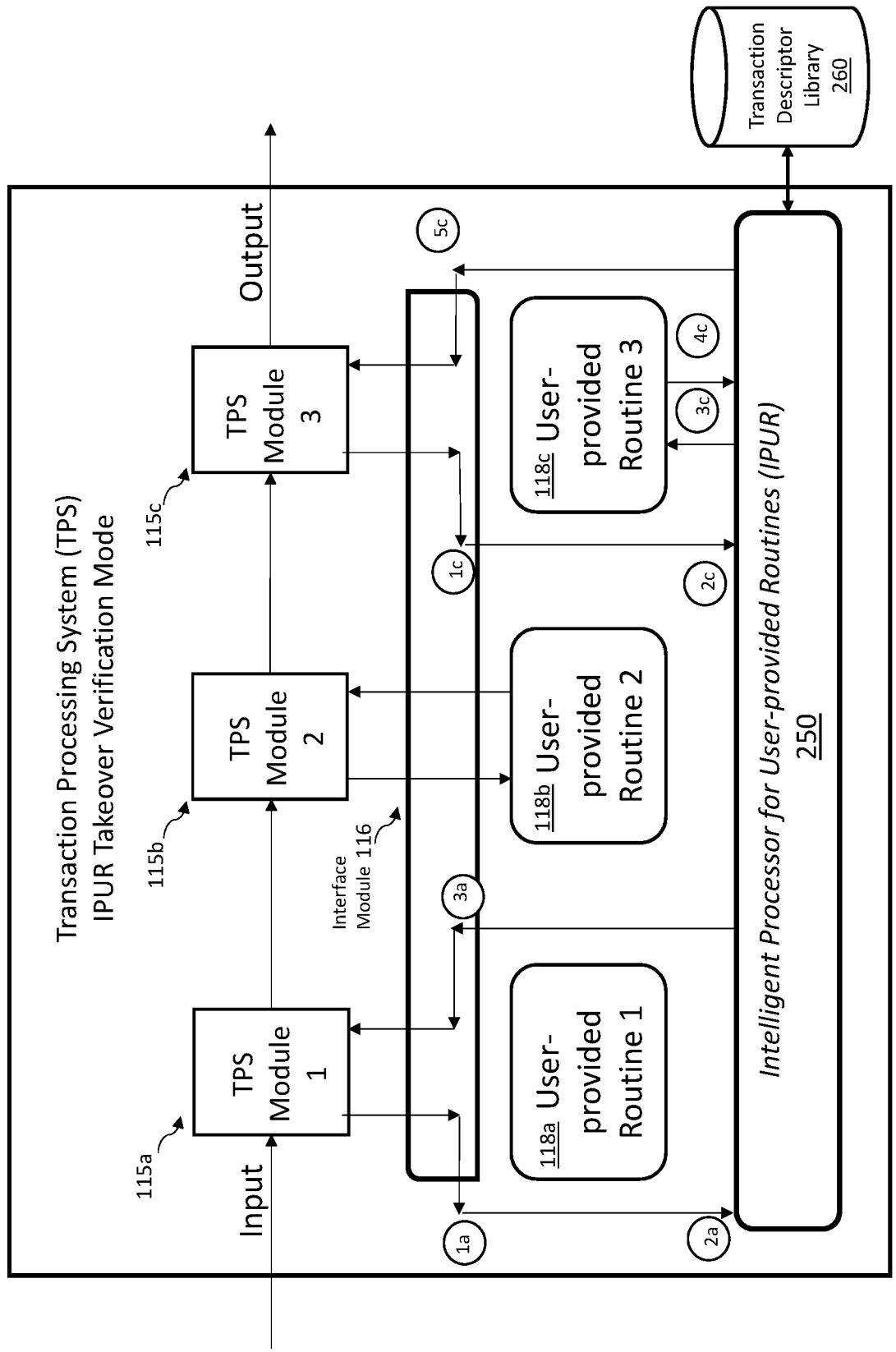
FIG. 4 depicts a block diagram for the takeover verification mode of the IPUR according to one or more embodiments of the present invention.

FIG. 4 depicts a block diagram for the takeover verification mode of the IPUR 250.

In FIG. 4, the user-provided routine 118a is taken over by the IPUR 250, but the IPUR 250 has not taken over the user-provided routine 118b. Additionally, in FIG. 4 the user-provided routine 118c is executing in a hybrid mode, also referred to as verification mode, which allows the review of the planned actions of the IPUR 250. In hybrid mode, the interface module 116 intercepts the TPS module 115c call to the user-provided routine 118c, shown as 1c, and instead, calls the IPUR 250, shown as 2c, with a unique identifier that will be used to retrieve the corresponding transaction descriptor from the transaction descriptor library 260. The IPUR 250 then passes control to the user-provided routine 118c, shown as 3c, using the retrieved transaction descriptor. This allows an administrator to review the results of a potential execution without actually executing the transaction. Thus, the need to correct the execution results of the transaction, such as having to back out data from a database, is avoided.

Once the user-provided routine 118c verifies the actions of the IPUR 250, the user-provided routine 118c can return the transaction descriptor to the IPUR 250, which assimilates the actions of the transaction descriptor for future transaction behavior, shown as 4c. The IPUR 250 then returns control to the interface module 118c, which ends by returning control, along with any transaction results, to the TPS module 115c, shown as 5c.

In this case, the IPUR 250 calls the user-provided routine 118c with a new parameter or a new function code so that the user-provided routine 118c recognizes the call as coming from the IPUR 250. Because it is a synchronous call to the user-provided routine 118c, the user-provided routine 118c completes verification of the source of the call, and of the requested action, and then returns back to the IPUR 250. The user-provided routine 118c can be viewed as a supervisor that has a final disposition for what actions the IPUR 250 takes. Although not a typical mode of processing, this mode may be useful for some customers who prefer to verify a mission critical operation.

Figure 5:
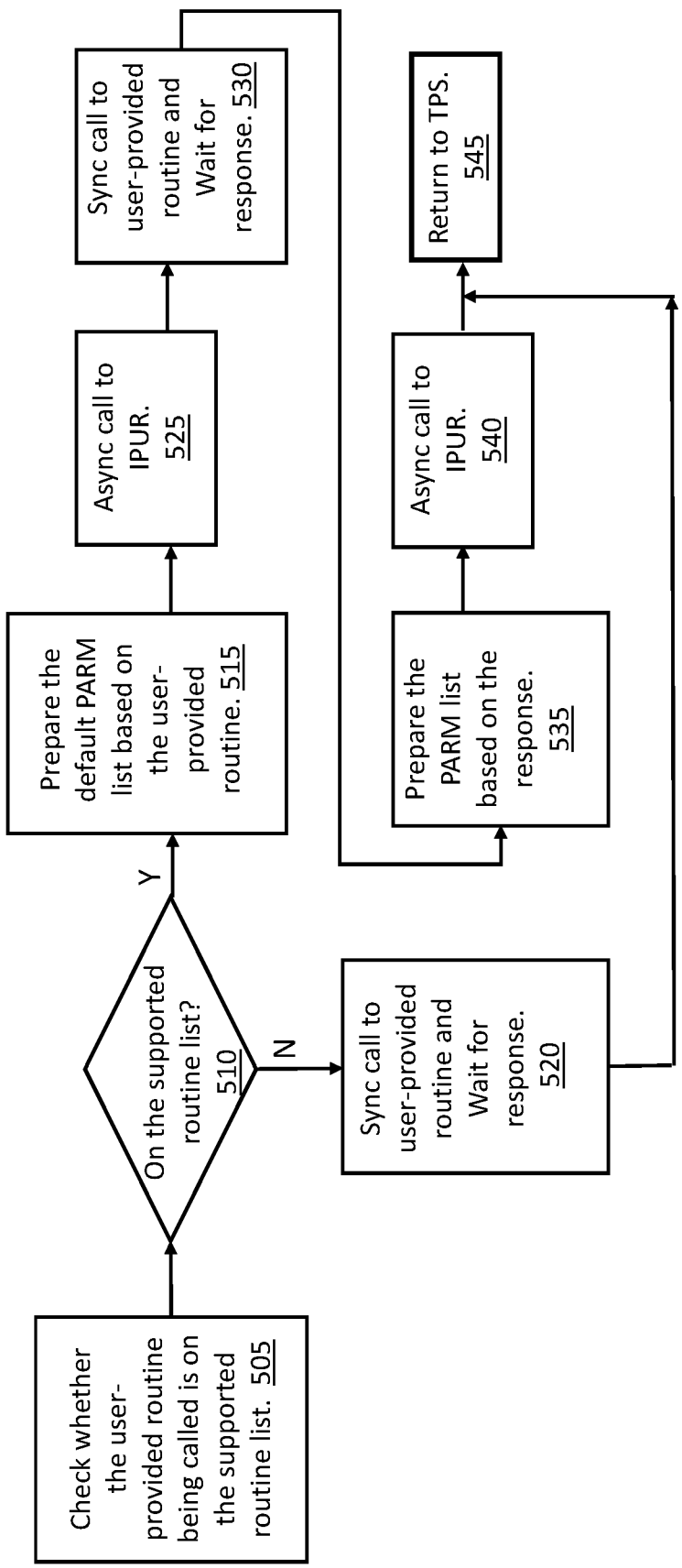
FIG. 5 depicts a flow diagram for the interface module in the observation phase of the IPUR according to one or more embodiments of the present invention.

FIG. 5 depicts a flow diagram for the interface module in the observation phase of the IPUR 250 from the interface module point of view. Another view is described with reference to the block diagram of FIG. 2.

Upon invoking an execution of a TPS module (TPS module 115a, 115b, and 115c), at 505 the interface module 116 checks whether the user-provided routine (user-provided routine 118a, 118b, and 118c) is a supported routine. If at 510, it is not a supported routine, then at 520 the interface module makes a synchronous call to the user-provided routine and waits for a response before returning to the TPS 110 at 545. In this embodiment, the interface module 116 includes an internal table with the names of all the supported user-provided routines that have been configured to the IPUR 250. Upon receiving control, the interface module 116 scans the internal table to see if the user-provided routine is supported for this operation. Some customers may have a complex user-provided routine to handle security information, and may not want to expose security processes to the IPUR 250, and therefore, will not configure the interface module 116 to call into the user-provided routine. By default, the IPUR 250 can override all the user-provided routines. However, a customer can determine which user-provided routine can be an exception, and configure the TPS 110 accordingly.

FIG. 2 is an example of the interface module 116 being configured to pass calls directly from the TPS module 115b directly to the user-provided routine 118b. The interface module 116 determines, for example by a search of its internal table, that this user-provided routine is not supported. This may be the case, for example, if the user-provided routine is a special user security routine, then the interface module 116 will not call the IPUR 250, but will call the user-provided routine 118b synchronously instead. Because it is a synchronous call, the interface module 116 waits for the response from the user-provided routine 118b. Once the response is received, the interface module 116 passes control back to the TPS module 115b. In this case, the interface module 116 is acting like a dummy module. If, at 510, the user-provided routine is a supported routine, then at 515, the interface module 116 prepares a parameter list for calling the IPUR 250, which is based on the user-provided routine. Each user-provided routine has a different set of input parameters. The interface module 116 copies the input parameters into a parameter list that is used for calling the IPUR 250 asynchronously. By having visibility to the input parameters, the IPUR 250 can learn the processing of the TPS module. At this point in the processing, only the IPUR 250 knows whether the transaction descriptor already exists. At 525, the interface module 116 makes an asynchronous call to the IPUR 250 with an input parameter list built by the interface module 116. One of the parameters indicates to the IPUR 250 that the call from the interface module 116 is sending input to the IPUR 250. An "input" call occurs prior to the user-provided routine receiving control. Similarly, an "output" call to the IPUR 250 is from the user-provided routine indicating the completion of the action. The IPUR 250 begins creating or locating a transaction descriptor for this user-provided routine using the template of the default transaction descriptor. A transaction descriptor might be created by a previous or first IPUR call. For the subsequent calls, the IPUR 250 simply locates it.

At 530, the interface module 116 makes a synchronous call to the user-provided routine 118 using the action parameters. This call is made concurrently with the asynchronous call to the IPUR 250, and allows the user-provided routine 118 to execute the action code and action parameters requested by its associated TPS module.

The interface module 116, when running in the observation, or learning mode, will call the user-provided routine 118 with the regular calling parameters instead of the default transaction descriptor. It appears to the user-provided routine 118 as if it is being called directly by the TPS module 115. The user-provided routine has no knowledge of the descriptor while running in learning mode.

At 535, the user-provided routine 118 returns control to the interface module 116, after completing the action code requested by its associated TPS module 115. At the return from the user-provided routine 118, the interface module 116 receives the results of the execution of the user-provided routine 118, including any return codes and computation results.

At 540, the interface module 116 makes an asynchronous call to the IPUR 250 to pass to the IPUR 250 the results of the execution of the user-provided routine 118. The IPUR 250 uses these results to complete and/or update the transaction descriptor from step 525. Processing ends at 545 with the return of control to the TPS 110.

Figure 6:
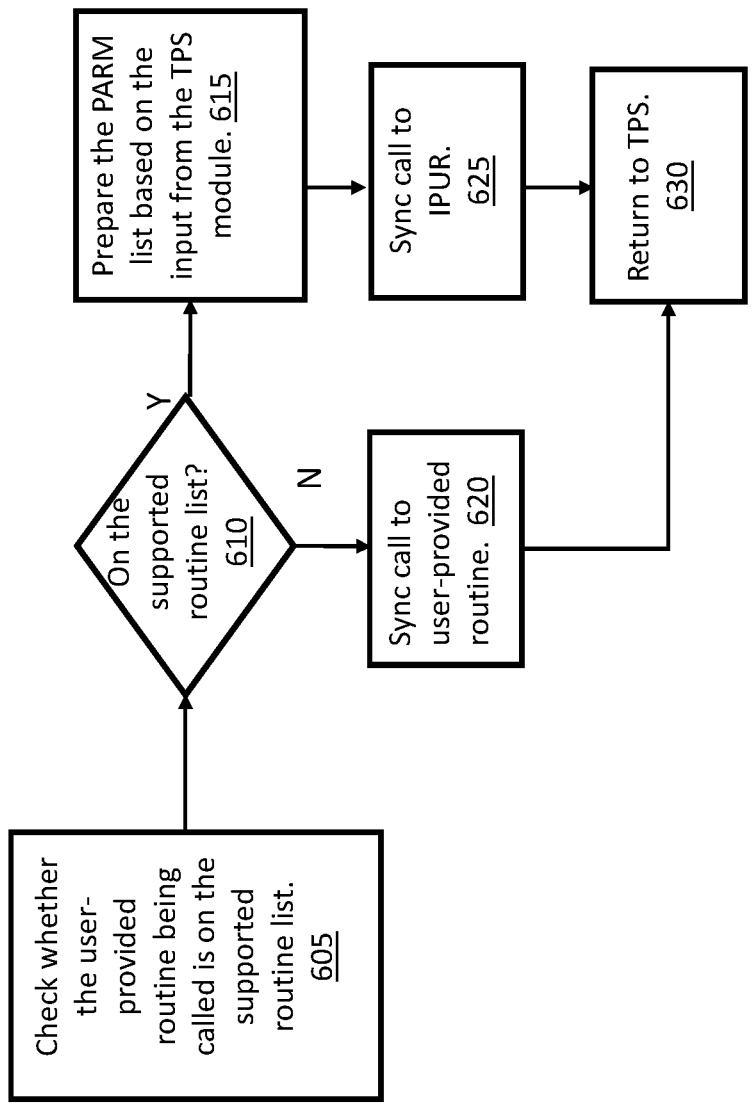
FIG. 6 depicts a flow diagram for the interface module in the takeover phase of the IPUR according to one or more embodiments of the present invention.

FIG. 6 depicts a flow diagram for the interface module 116 in the takeover phase of the IPUR 250 from the interface module 116 point of view. Another view is described with reference to the block diagram of FIG. 3.

Upon invoking an execution of a TPS module (TPS module 115a, 115b, and 115c), at 605 an interface module 116 checks whether the user-provided routine (user-provided routine 118a, 118b, and 118c) is a supported routine. As described above with reference to FIG. 5, the interface module 116 scans its internal table to check that the user-provided routine 118 is supported for this operation. If, at 610, it is not a supported routine, then at 620 the interface module 116 makes a synchronous call to the user-provided routine 118 and waits for a response before returning to the TPS 110 at 630.

For example, consider a user-provided routine that is processing credit card information and social security information. This might be the case for user-provided routine 118b. Here, for security reasons, the customer does not want to permit the IPUR 250 descriptor to process this information. Therefore, the customer has indicated that this special user-provided routine is not supported for IPUR 250, and is not on the supported list in the interface module 116.

When a TPS module is trying to call this special user-provided routine 118b, the interface module 116 simply bypasses the IPUR 250 and calls the user-provided routine 118b directly. Because it is synchronous call, the interface module 116 will wait for the response and then return to the TPS module 115b.

If, at 610, the user-provided routine 118 is a supported routine, then at 615, the interface module 116 prepares a parameter list which is based on the macro input from the TPS module 115 in this phase, only the IPUR 250, and not the interface module 116, is aware whether the descriptor exists.

At 625, the interface module 116 makes a synchronous call to the IPUR 250 using the default transaction descriptor. In this takeover phase, their 250 reads the input from the interface module 116 and locates the corresponding transaction descriptor. The IPUR 250 executes the action based on the contents of the located descriptor. The IPUR 250 can update the transaction descriptor with the results of the current execution that was invoked by the interface module 116 in the takeover mode. Processing ends at 630 with the return of control to the TPS 110.

Figure 7:
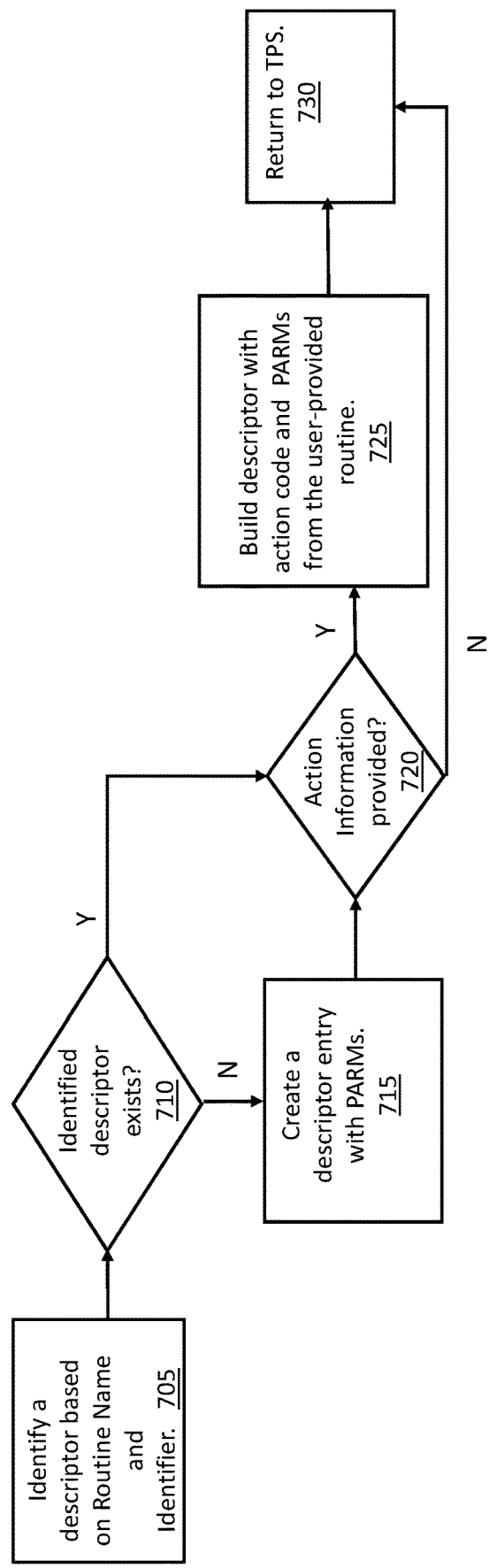
FIG. 7 depicts a flow diagram for the observation phase of the IPUR according to one or more embodiments of the present invention.

FIG. 7 depicts a flow diagram for the observation phase of the IPUR 250 from the IPUR 250 point of view. Another view is described with reference to the block diagram of FIG. 2.

At 705, the IPUR 250 receives a call from the interface module 116, with one of several options, including executing a transaction descriptor and bypassing the user-provided routine 118b, creating and/or modifying a transaction descriptor, or executing in hybrid mode. The input to the IPUR 250 includes an execution mode, the user-provided routine name, a transaction identifier, an input message, and a parameter list. The input message is an optional input parameter which is the transaction input message. Some of the user-provided routines may have the ability to modify the transaction input message.

At 710, the IPUR 250 determines whether the requested transaction descriptor exists, such as by searching the transaction descriptor library 260.

If, at 710, the requested transaction descriptor is not located in the transaction descriptor library 260, then at 715 the IPUR 250 creates a transaction descriptor entry using the default parameters it received in the call.

At 720, the IPUR 250 determines whether action information was included in the default parameters. If action information was not included, the IPUR 250 returns to the TPS 110 at 730. Action information may not be included when the IPUR 250 receives control to process an "input" request which is called before the user-provided routine 118a and c executes. The action information is not necessarily the same as the parameters and action codes sent by the TPS module 115a and c, because the purpose is to build a partial transaction descriptor entry.

When the IPUR 250 is in the observation phase, the IPUR 250 builds and creates transaction descriptors which simulate the operations performed by a user-provided routine 118a and c. In this case, the IPUR 250 is called asynchronously. Once the IPUR 250 completes the operation, the IPUR 250 returns to the TPS 110. However, if the action information was included, then at 725 the IPUR 250 builds the descriptor using the action information and parameters that the user-provided routine 118a and c used in its execution. The IPUR 250 then updates the transaction descriptor library 260 with the new descriptor. Processing ends at 730 with the IPUR 250 returning control to the TPS 110.

Figure 8:
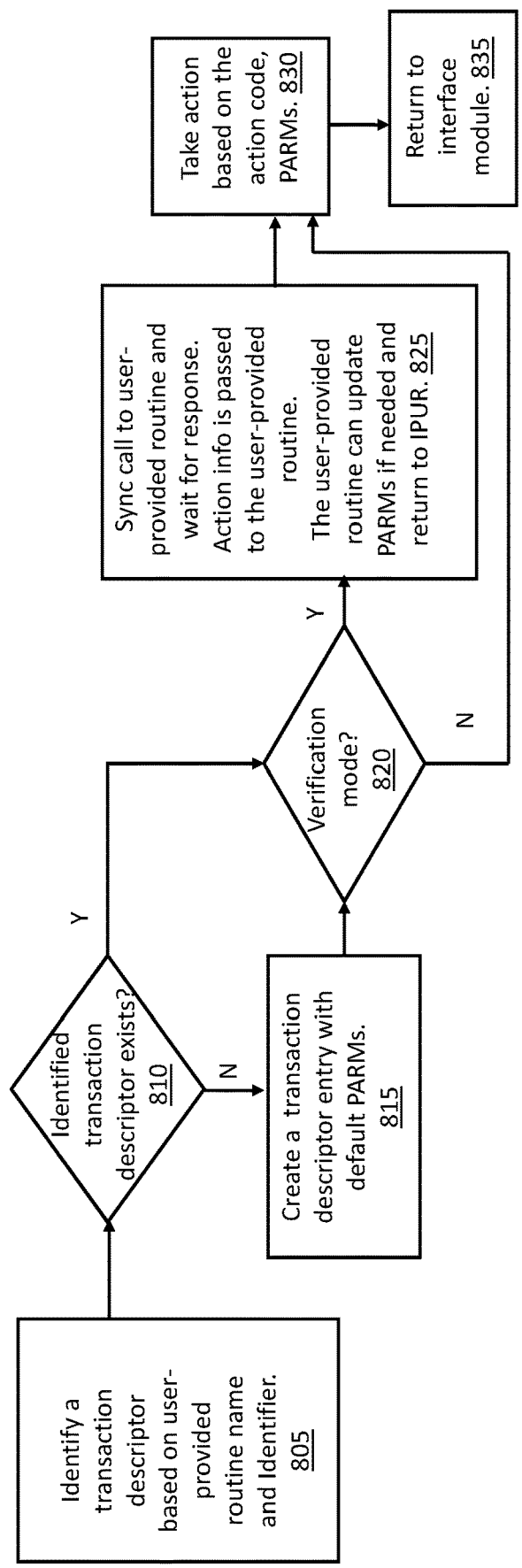
FIG. 8 depicts a flow diagram for the takeover phase of the IPUR according to one or more embodiments of the present invention.

FIG. 8 depicts a flow diagram for the takeover phase of the IPUR from the IPUR 250 point of view. Another view is described with reference to the block diagram of FIG. 3.

Since the IPUR 250 is executing in the takeover phase, a transaction descriptor is likely already in the transaction descriptor library 260. At 805, the IPUR 250 receives a call from the interface module 116 that includes execution mode (e.g., takeover, observation, and hybrid), the user-provided routine name, a transaction identifier, input message, and parameter list.

At 810, the IPUR 250 searches the transaction descriptor library 260 for a transaction descriptor matching that requested by the interface module 116. If the requested transaction descriptor does not exist, then at 815, the IPUR 250 creates one using the received parameters. However, whether the transaction descriptor is created, or is located in the transaction descriptor library 260, at 820 the IPUR 250 checks whether the requested mode indicates the IPUR 250 is executing in verification mode.

At 820, if the IPUR 250 is not in verification mode, then at 830 the IPUR 250 executes the action requested in the transaction descriptor action code, using the parameters. Processing ends at 835 with a return to the interface module 116.

If at 820 the IPUR 250 is in verification mode, then at 825 the IPUR 250 issues a synchronous call to the user-provided routine 118a and c using the parameters in the transaction descriptor. The user-provided routine 118a and c can update the parameters, as needed and return to the IPUR 250.

When the customer chooses the verification mode for some of their user-provided routines, it indicates the desire to make a final review of the action before the IPUR 250 actually executes it. In this verification mode, the customer can use the IPUR 250 for most of the user-provided routines. However, in some sensitive or critical operations, the customer may still want a final review before the IPUR 250 actually executes. Updating the parameters for the IPUR 250 indicates to the IPUR 250 whether updating the parameters is needed.

At 830, the IPUR 250 then executes the transaction descriptor and processing ends at 835 with a return to the interface module 116.

Figure 9:
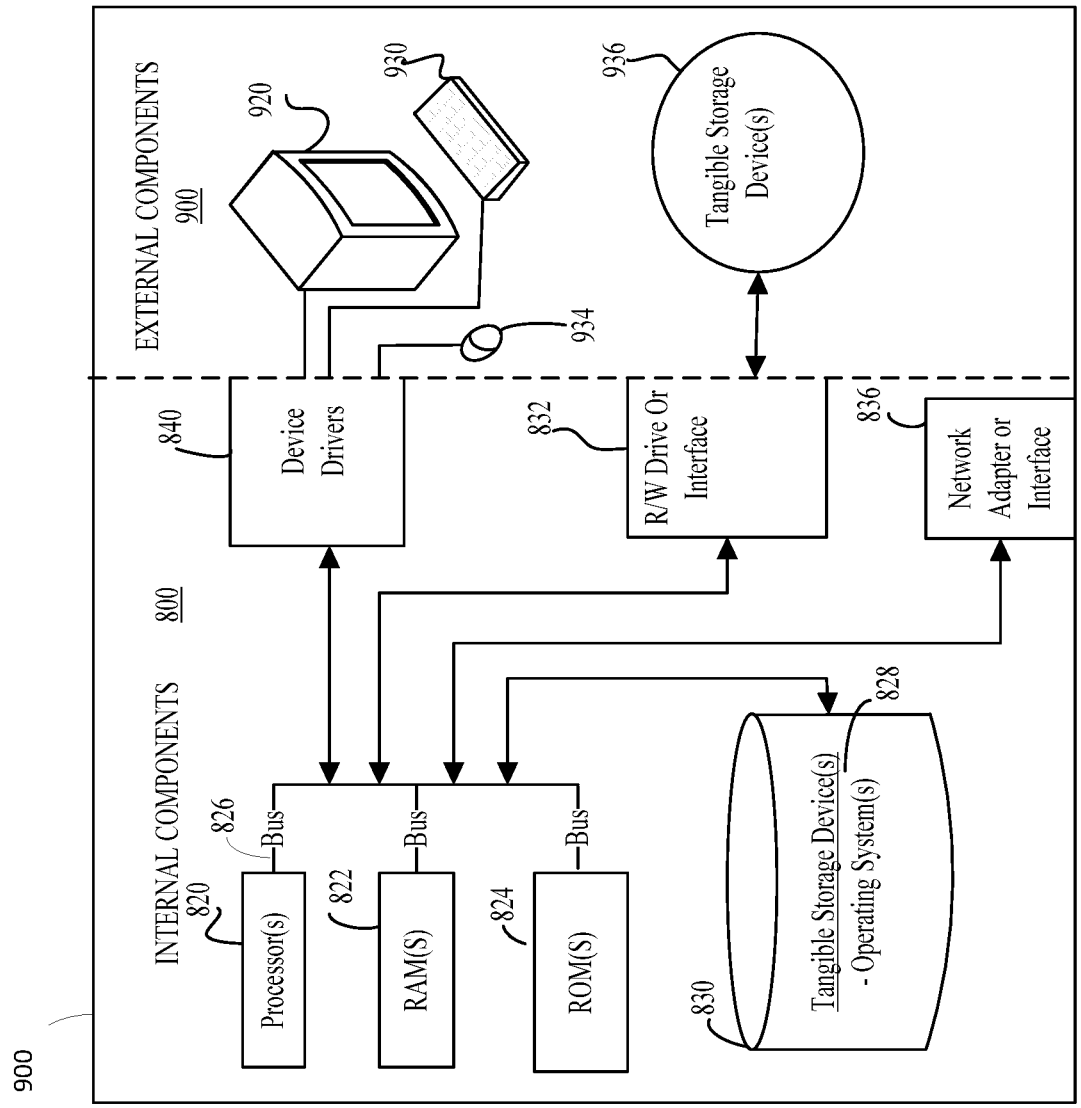
FIG. 9 is a block diagram of an embodiment of a computer system or cloud server in which the present invention may be implemented.

FIG. 9 is a block diagram of internal and external components of computers and servers depicted in FIG. 1 according to at least one embodiment.

It should be appreciated that FIG. 9 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User transaction processing system 110 and client 102 may include respective sets of internal components 800 and external components 900 illustrated in FIG. 9. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a transaction processing system 110 and IPUR 250, may be stored on one or more computer-readable tangible storage devices 830 for execution by one or more processors 820 via one or more RAMs 822 (which typically include cache memory). In the embodiment illustrated in FIG. 9, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The transaction processing system 110 and IPUR 250 can be stored on one or more of the respective portable computer-readable tangible storage devices 936, read via the respective R/W drive or interface 832 and loaded into the respective hard drive 830.

Each set of internal components 800 may also include network adapters (or switch port cards) or interfaces 836 such as a TCP/IP adapter cards, wireless Wi-Fi interface cards, or wireless interface cards or other wired or wireless communication links. The software components of the IPUR 250 can be downloaded from an external computer (e.g., server) via a network (for example, the Internet, a local area network or other, wide area network) and respective network adapters or interfaces 836. From the network adapters (or switch port adaptors) or interfaces 836, the software components of the IPUR 250 are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by software or hardware-based systems that perform the specified functions or acts or carry out combinations of computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for an intelligent processor for user-provided routines (IPUR) in a transaction processing system, comprising:
   receiving, by an interface module, a request for an operation from a transaction processing module that is executing a portion of a transaction;
   determining, by the interface module, whether a user-provided routine that is paired with the transaction processing module is supported for the requested operation;
   executing, by the user-provided routine, the requested operation for the transaction processing module, based on the user-provided routine being supported;
   based on the user-provided routine being supported and the interface module being in an observation mode, creating, by the interface module, a parameter list comprising parameters received from the transaction processing module, and asynchronously calling the IPUR by the interface module;
   locating or creating, by the IPUR, a transaction descriptor responsive to receiving the asynchronous call from the interface module;
   synchronously calling the user-provided routine by the interface module and concurrently asynchronously calling the IPUR by the interface module using the parameter list; and
   in response to the user-provided routine completing execution, receiving, by the interface module, execution results from the user-provided routine, and asynchronously calling, by the interface module, the IPUR to update the transaction descriptor with the execution results, wherein the IPUR updates the transaction descriptor with the execution results.

2. The method of claim 1, further comprising:
   based on the user-provided routine being supported and the interface module being in a takeover mode, the interface module synchronously calling the IPUR to locate the transaction descriptor corresponding to the parameter list from the transaction processing module; and
   executing, by the IPUR, the contents of the transaction descriptor.

3. The method of claim 1, further comprising:
   determining, by the interface module, whether the user-provided routine is supported based on the user-provided routine being located in a table internal to the interface module;
   in response to determining that the user-provided routine is not supported, the interface module synchronously calling the user-provided routine using the parameters received from the transaction processing module; and
   upon the user-provided routine completing execution, returning control to the transaction processing system.

4. The method of claim 1, further comprising:
   based on the user-provided routine being supported and the interface module being in a verification mode, the interface module calling the IPUR to simulate the execution of the transaction descriptor.

5. The method of claim 1, wherein the interface module is interposed between the transaction processing module and the user-provided routine, and intercepts calls between the transaction processing module and the user-provided routine.

6. The method of claim 1, wherein the interface module executes in the observation mode, a verification mode, or a takeover mode.

7. The method of claim 1, wherein the interface module includes an internal table of user-provided routines that are supported for operations by the IPUR.

8. The method of claim 1, wherein the IPUR executes in the observation mode for a user-defined amount of time.

9. The method of claim 1, wherein in a takeover mode, the interface module bypasses the IPUR and synchronously calls to the user-provided routine directly.

10. The method of claim 1, wherein the user-provided routine is removable from the transaction processing system upon the interface module executing in a takeover mode.

11. A computer system for an intelligent processor for user-provided routines (IPUR) in a transaction processing system, comprising:
    one or more processors, one or more computer-readable storage devices, and a plurality of program instructions stored on at least one of the one or more storage devices for execution by at least one of the one or more processors, the plurality of program instructions comprising:
    receiving by an interface module, a request for an operation from a transaction processing module that is executing a portion of a transaction, wherein the operation includes an observation mode, a takeover mode, and a verification mode;
    determining by the interface module whether a user-provided routine that is paired with the transaction processing module is supported for the requested operation;
    executing by the user-provided routine, the operation for the transaction processing module, based on the user-provided routine being supported
    based on the user-provided routine being supported and the interface module being in an observation mode, creating, by the interface module, a parameter list comprising parameters received from the transaction processing module, and asynchronously calling the IPUR by the interface module;
    locating or creating, by the IPUR, a transaction descriptor responsive to receiving the asynchronous call from the interface module;
    synchronously calling the user-provided routine by the interface module and concurrently asynchronously calling the IPUR by the interface module using the parameter list; and
    in response to the user-provided routine completing execution, receiving, by the interface module, execution results from the user-provided routine, and asynchronously calling, by the interface module, the IPUR to update the transaction descriptor with the execution results, wherein the IPUR updates the transaction descriptor with the execution results.

12. The computer system of claim 11, wherein the interface module is interposed between the transaction processing module and a user-provided routine.

13. The computer system of claim 11, wherein in the takeover mode, the interface module bypasses the IPUR and synchronously calls to the user-provided routine directly; and wherein the user-provided routine is removable from the transaction processing system upon the interface module executing in the takeover mode.

14. A computer program product for an intelligent processor for user-provided routines (IPUR) interface module, comprising a computer-readable storage medium having computer-readable program code embodied therewith, the computer-readable program code when executed on a computer causes the computer to:

receive by an interface module, a request for an operation from a transaction processing module that is executing a portion of a transaction, wherein the operation includes an observation mode, a takeover mode, and a verification mode;

determine by the interface module, whether a user-provided routine that is paired with the transaction processing module is supported for the requested operation;

execute by the user-provided routine, the operation for the transaction processing module, based on the user-provided routine being supported based on the user-provided routine being supported and the interface module being in an observation mode, creating, by the interface module, a parameter list comprising parameters received from the transaction processing module, and asynchronously calling the IPUR by the interface module;

locating or creating, by the IPUR, a transaction descriptor responsive to receiving the asynchronous call from the interface module;

synchronously calling the user-provided routine by the interface module and concurrently asynchronously calling the IPUR by the interface module using the parameter list; and in response to the user-provided routine completing execution, receiving, by the interface module, execution results from the user-provided routine, and asynchronously calling, by the interface module, the IPUR to update the transaction descriptor with the execution results, wherein the IPUR updates the transaction descriptor with the execution results.

15. The computer program product of claim 14, further comprising:

based on the user-provided routine being supported and the interface module being in the takeover mode, the interface module creating the parameter list, based on the parameters sent by the transaction processing module, the interface module synchronously calling the IPUR using the parameter list from the transaction processing module;

locating, by the IPUR, the transaction descriptor corresponding to the parameter list; and executing, by the IPUR, the contents of the transaction descriptor.

16. The computer program product of claim 14, wherein the interface module executes in the observation mode, the verification mode, or the takeover mode.

17. The computer program product of claim 14, wherein the interface module includes an internal table of user-provided routines that are supported for operations by the IPUR.

18. The computer program product of claim 14, wherein the IPUR executes in the observation mode for a user-defined amount of time.

\* \* \* \* \*